United States Patent [19]

Mellqvist et al.

[11] Patent Number: 4,847,096
[45] Date of Patent: Jul. 11, 1989

[54] PROCESS FOR TREATING WHEY PROTEINS, AND PRODUCT OBTAINED

[75] Inventors: Carl O. Mellqvist; Ann Mellqvist, both of Skanör, Sweden

[73] Assignee: Albuglobe Aktiebolag, Sweden

[21] Appl. No.: 121,091

[22] Filed: Nov. 16, 1987

[30] Foreign Application Priority Data

Nov. 25, 1986 [SE] Sweden .............................. 8605045-7

[51] Int. Cl.$^4$ .............................................. A23C 21/02
[52] U.S. Cl. ........................................ 426/41; 426/42; 426/657; 435/69
[58] Field of Search ...................... 426/34, 41, 42, 63, 426/7, 656–657; 435/68, 69, 106

[56] References Cited

U.S. PATENT DOCUMENTS 3,857,966 12/1974 Feldman et al. ...................... 426/41
4,427,658 1/1984 Maubois et al. ...................... 426/41

FOREIGN PATENT DOCUMENTS 0022019 1/1981 European Pat. Off. .............. 426/41

Primary Examiner—Marianne Cintins
Attorney, Agent, or Firm—Brumbaugh, Graves, Donohue & Raymond

[57] ABSTRACT

To facilitate the separation off of fat from whey protein concentrates and simultaneously avoid protein losses, and obtain a whey protein concentrate having improved taste and storage stability a whey protein concentrate is subjected to hydrolysis by means of proteolytic enzyme until a degree of hydrolysis of between 0.2 and 4 has been obtained.

11 Claims, No Drawings

PROCESS FOR TREATING WHEY PROTEINS, AND PRODUCT OBTAINED

DESCRIPTION

1. Technical Field

The present invention relates to a process for treating whey proteins in order to facilitate the separation of fats therefrom, and to obtain a product having improved taste and storage stability.

2. Background of the Invention

Whey is a residual product obtained in the manufacture of cheese which due to its high contents of water has little economical value. A typical composition of whey, with little variations, is as follows:

Protein—0.6%
Other nitrogen compounds—0.2%
Lactose—4.6%
Ashes—0.6%
Water—94.0%

The above figures includes a fat content of about 0.1 to 0.2%, depending on what type of cheese preparation the whey is derived from. If the whey is dried, i.e. the water content is reduced to some few percent only, the fat content will reach about 3%.

The nutritional value of the proteins present in whey is among the highest known, and several methods are today used industrially to separate, and concentrate the protein fraction. The most common method is ultra filtration, wherein lactose, minerals and water are reduced from the standard whey, and the dried whey protein products generally present contain up to about 80% of protein. As the fat fraction can not be separated from a protein concentrate without great protein losses, a powder containing 80% of protein will have a fat content of about 7%. Such an amount of fat primarily causes a taste problem as the product will obtain a characteristically unpleasant taste, which is very difficult to mask. The product exhibits an impaired storage stability, as well, which is a great problem. It is thus desirable to be able to furnish a process, which facilitates a reduction of the fat content in the whey protein concentrate to a minimum, and which gives a product with improved taste and storage stability.

The use of whey protein concentrates in foodstuffs is based upon their functional, i.e. emulsifying, and viscosity influencing properties, as well as the nutritional properties of the concentrate. The costs for recovering the proteins will, however, become quite high, as almost 200 liters of whey are needed to give 1 kg of proteins, and as a consequence thereof the most common use will be within the hospital care and health care sectors, as a protein additive. By reducing the fat content to a minimum the economical conditions to use the product as a protein additive in conventional foodstuffs for general use should be improved.

Conventional centrifugation of standard whey e.g., in a milk separator can reduce the fat content down to a residual amount of 0.05%, which means a fat content of about 1.5% in a dried whey.

After concentration of the whey by means of ultra filtration the fat elimination can not possibly be carried out by means of centrifugation due to the physical properties of the whey protein concentrate. If one should affect the whey more vigorously than normally, e.g., by a longer staying period in the separator, or the use of ultra centrifuges using higher G-forces, one may separate off fat, but not without great protein losses.

DESCRIPTION OF THE PRESENT INVENTION

The present invention thus relates to a process for treating whey proteins to facilitate the separation of fat therefrom. The process is characterized in that the whey proteins are subjected to hydrolysis by means of a proteolytic enzyme, or mixture of proteolytic enzymes, to obtain a degree of hydrolysis of up to 4.0 preferably between 0.2 and 4.0, and even more preferably between about 0.5 and 4.0.

The protein product obtained according to the present invention retains its functional properties and will give a clear, slightly opaque solution with water. Further, the protein product is capable of being whipped to a stable foam, and can in this respect replace egg whites. Moreover, its emulsifying properties, as well as the taste, are excellent. Thereby highly concentrated protein pastries can be produced.

The process of the present invention contemplates one starting with whey proteins, preferably in the form of a whey protein concentrate in order to avoid the handling of too much water, the whey protein concentrate then being obtained in a conventional manner, such as by ultra filtration, and the protein concentrate thereby has a suitably dry matter content of 15 to 50%, preferably 20 to 35%. The whey proteins are subjected to an enzymatic hydrolysis by means of a proteolytic enzyme, or mixture of proteolytic enzymes until the degree of hydrolysis given above has been reached. The term "degree of hydrolysis" (below denoted DH) is defined as the amount, in percentage, of peptide bonds that have been cleaved during the hydrolysis. It is commonly known that a bitter taste appears with the hydrolysis of proteins. This is said to be due to the fact that hydrophobic amino acids or peptide ends are made free and give effect when the protein has been hydrolysed to a certain extent. At a degree of hydrolysis exceeding DH 4 to 5 the bitterness is very pronounced when hydrolysing whey protein. This is a very moderate degree of hydrolysis. However, it is very surprising to find that a degree of hydrolysis of DH up to 4.0, preferably between 0.2 to 4.0, more preferably between about 0.5 and 4.0, gives such a great effect that fat can be easily separated off from the whey proteins in a conventional way, e.g., by means of centrifugation.

The conditions during the hydrolysis of the process, such as the type of enzyme used, the amount of enzyme, hydrolysis temperature, hydrolysis time and pH are not critical to the invention as long as the degree of hydrolysis can be achieved. One skilled in the art can, by means of simple preparatory experiments or knows by experience what conditions are to used and what conditions are optimal at the process. Suitable enzymes used in the process are found on the market, and non-restricting examples of these are a proteolytic enzyme prepared from *Bacillus subtilis* (Neutrase ® 0.5L), and a proteolytic enzyme prepared from *Bacillus licheniformis* (Alcalase ® 0.6L). Further examples are Pepsin 1%, 50° C. and 1 hr; Papain 3000 1%, 40° C. and 2 hrs; Chymotrypsin 1%, 40° C. and 1 hr; Pancreatin 4NE 1%, 40° C. and 1 hr, all at pH 7; an enzyme mixture prepared from *Aspergillus oryzae* var. pH 9, 1%, 55° C. and 90 min, which is inactivated at pH 4 at 68° C. for 1 hr. The four first mentioned enzymes are inactivated at pH 4, as well as the conditions and the process previously mentioned for all types. A mixture of enzymes is also possible. The hydrolysis is finished when the degree of hydrolysis has been reached, and it can be achieved in a conventional manner, e.g., by inactivation of the enzyme by decreasing the pH, e.g., to pH 4, or by heating the hydrolysis solution, whereby in the latter case care must be taken not to affect the proteins negatively. Then, the fat can be separated off by means of centrifugation. Although not being bound by any theory it is believed that the hydrolysis of the whey proteins leads to such a change of the emulsifying properties of the proteins that a separation off of the fats by means of centrifugation is considerably facilitated. By means of the process according to present invention there it is not only obtained a product with improved taste and improved storage stability, but one that also reduces expected protein losses to a minimum. The invention makes it now possible to utilize the high grade proteins of whey for fortifying the nutritional contents in conventional foodstuffs without causing taste problems. It is also easy to eat protein products having an extremely high content of protein. This is a great progress within the art.

Although a whey protein concentrate may be preferred as a starting material of the present process, any whey can be used, such as standard whey obtained directly from the cheese production in the form of sweet as well as acid whey, concentrated whey, which merely is a partly dried whey, and whey protein concentrate, which is a lactose reduced whey protein quality. Standard whey, so called natural whey, exists in a lactose reduced variety as well.

The invention will now be described in more detail with reference to examples, which are not to be regarded as limiting to the invention.

EXAMPLE 1

A whey protein concentrate having a dry matter content of 22.5%, a protein content of 15.2% and a fat content of 1.6% was treated at 50° C. for 20 min at pH 8 using a proteolytic enzyme prepared from *Bacillus licheniformis* and marketed under the trade mark Alcalase ® 0.6L. The amount of enzyme was 1.5% calculated on the protein dry matter. After the 20 min hydrolysis the degree of hydrolysis was DH 2.2. After inactivation of the enzyme by decreasing pH to 4 for 60 min, the fat was separated off by centrifugation in a conventional milk separator. After finalized centrifugation the residual fat content reached 0.06%. Then the protein concentration was continued in an ultra filtration equipment until a dry matter content of 39% had been reached. During the final phase demineralized water was added and the concentration took place as a dialysis. The protein content of the dried powder obtained was 98% of the dry matter content, and the fat content was 0.5%. The taste was completely neutral.

The whey protein product thus obtained was tested in a whipping test in order to test the functional properties of the protein. Thereby two different tests were applied, viz. a) a foaming test, where 18 g of an 11% protein solution was whipped for 3 min. The protein of the present invention thereby gave 180 cm³ of foam, compared with the same weight of albumen (white of egg) which gave 175 cm³. After 30 min the two foams had decreased 30 ml, and b) a whipping test where the inverted value of density is measured (ml/g). Hereby an 11% solution was whipped for 3 min whereupon the ml/g was determined, as well as the loss in ml after 30 min. The results are given in the TABLE below.

TABLE

| Product | ml/g | Loss after 30 min ml |
|---|---|---|
| Protein of the invention | 10.2 | 8 |
| Albumen | 10.0 | 12 |
| Protein of the invention + equal weight of sugar | 3.1 | 4 |
| Albumen + equal weight of sugar | 3.5 | 2 |

As evident from the Table above the functional properties of the protein product obtained are equal to albumen, or even better.

Other functional properties of the present product are that it gives an almost clear solution in water, it may sometimes become a little opaque (blue), that it functions as an emulsifier, mayonnaise can easily be prepared, high protein content pastes can be prepared and orally administered without any palatability problem.

EXAMPLE 2

A whey protein concentrate having a dry matter content of 35.1%, and a protein content of 27.0% and a fat content of 2.8%, was treated with a proteolytic enzyme prepared from *Bacillus subtilis* and marketed under the trade mark Neutrase ® 0.5L. The amount of enzyme was 2% calculated on the dry protein content. The hydrolysis took place at a temperature of 20° C. and at a pH of 7,0. After a reaction time of 70 min the degree of hydrolysis was DH 1.2. Then the enzyme was inactivated by decreasing pH to 4.0 for 1 hr, the solution was made neutral and the fat was separated off to a residual amount of 0.06% in a conventional manner. One obtained a dry powder which contained 83.9% of protein calculated on the dry matter and 0.18% of fat. The taste was neutral and the protein product was easily whipped and provided a stable foam.

EXAMPLE 3

Example 1 was repeated under the same conditions with the exception that the degree of hydrolysis after finalized hydrolysis was DH 4.1. The final product in the form of a dry powder had a bitter taste, which is difficult to handle.

EXAMPLE 4

Example 2 above was repeated under the same conditions, however, with the exception that the hydrolysis was carried out to a degree of hydrolysis of 0.52. Thereby the protein losses exceeded 5%, but the fat content in the final dry protein product was only 0.9%. The protein product gave a stable foam in the whipping test.

EXAMPLE 5

A whey protein concentrate according to Example 2 above was treated in accordance with Example 2, with the exception that the hydrolysis was run to a degree of hydrolysation of DH=0.15 only. The residual fat content after centrifugation in a milk separator was 1.0%. The protein obtained still had its functional properties left, and was whippable.

EXAMPLE 6

Example 1 above was repeated in all steps with the exception that no proteolytic enzyme was added. The final dry protein product obtained did not show any degree of hydrolysation, and no fat could be separated off when the product solution was centrifuged before final drying. The fat content of the final dried product was about 7%.

It is evident from the Examples above that the DH range up to 4.0 is critical in the process of the present invention, and that the fat content is reduced from about 7%, in the case of a conventionally produced whey protein concentrate, to a fat content of the magnitude 0.2 to 1.0% in the case of the product according to the invention. By this decrease in fat contents one has obtained an organoleptically advantageous product with little or no protein losses, and which product can be used as a full grade protein additive in foodstuffs, as well as in high grade feed-stuffs for animals, particularly high grade feedstuffs for young animals needing great protein additions, or high quality protein additions.

We claim:

1. A process for treating whey products containing whey protein in order to facilitate the separation of fat therefrom, comprising
    (a) subjecting the product to hydrolysis by means of at least one proteolytic enzyme at a temperature greater than 15° C. but less than the inactivation temperature of the enzyme used, wherein the enzyme comprises at least 0.5% by weight of the dry protein matter;
    (b) permitting hydrolysis to occur until the degree of hydrolysis is between 0.2 and 4.0;
    (c) discontinuing the hydrolysis by lowering the pH to a value such that the reaction essentially ceases to occur; and
    (d) isolating and removing the fat which is present so that the remaining fat comprises between 0.2 and 1.0% by weight of the protein dry matter.

2. The process according to claim 1, wherein the whey protein product comprises a whey protein concentrate.

3. The process according to claim 2, wherein the whey protein concentrate has a dry matter content prior to hydrolysis of 15 to 50%.

4. The process according to claim 3, wherein the dry matter content prior to hydrolysis is between 20 and 35%.

5. The process according to claim 1, wherein the hydrolysis is discontinued by lowering the pH to approximately 4.

6. The process according to claim 1 wherein the enzyme comprises 1.5 to 2.0% by weight of the dry protein matter.

7. The process according to claim 1, wherein the hydrolysis is permitted to occur until the degree of hydrolysis is between 0.5 and 4.0.

8. The process according to claim 1, wherein the fat remaining after separation comprises less than 0.5% by weight of the dry protein matter.

9. An enzymatically hydrolyzed protein product derived from whey proteins, wherein said proteins have a degree of hydrolysis between 0.2 and 4.0, and wherein the protein product comprises between 0.2 and 1.0% by weight of fat, such that the product possesses emulsifying, viscosity-influencing and nutritional properties.

10. A protein product according to claim 9, wherein the weight % of fat is between 0.2 and 0.5.

11. A protein product according to claim 9, wherein the degree of hydrolysis is between 0.5 and 4.0.

* * * * *